(12) United States Patent
Streng et al.

(10) Patent No.: US 8,066,948 B2
(45) Date of Patent: Nov. 29, 2011

(54) REACTOR FOR THE CONTINUOUS AND SIMULTANEOUS PRODUCTION OF DIFFERENT POLYESTER PRODUCTS HAVING ADJUSTABLE VARIABLE VISCOSITY, THE PROGRESS OF THE PROCESS BEING REGULATED VIA THE HYDRAULIC DRIVE SYSTEM

(75) Inventors: Michael Streng, Maintal (DE); Clifford Schaeferskurpper, Saalfeld (DE); Andreas Hilpert, Gelnhausen (DE)

(73) Assignee: EPC Industrial Engineering GmbH, Alzenau (DE)

( * ) Notice: Subject to any disclaimer, the term of this patent is extended or adjusted under 35 U.S.C. 154(b) by 570 days.

(21) Appl. No.: 11/814,353

(22) PCT Filed: Jan. 26, 2006

(86) PCT No.: PCT/EP2006/000807
§ 371 (c)(1),
(2), (4) Date: Mar. 8, 2009

(87) PCT Pub. No.: WO2006/079557
PCT Pub. Date: Aug. 3, 2006

(65) Prior Publication Data
US 2009/0208381 A1    Aug. 20, 2009

(51) Int. Cl.
*B01J 19/00* (2006.01)
*B01J 19/18* (2006.01)
*C08F 2/00* (2006.01)

(52) U.S. Cl. ........ 422/134; 422/129; 422/135; 422/136; 526/64

(58) Field of Classification Search .......... 422/134–136, 422/129; 526/64; 528/196, 308.6
See application file for complete search history.

(56) References Cited

U.S. PATENT DOCUMENTS

| | | | |
|---|---|---|---|
| 3,279,894 A | 10/1966 | Tate et al. | |
| 3,337,508 A | 8/1967 | Bachmann et al. | |
| 3,386,810 A | 6/1968 | Burke et al. | |
| 3,440,019 A | 4/1969 | Albrecht et al. | |
| 3,484,213 A | 12/1969 | Dew et al. | |
| 3,526,484 A | 9/1970 | Kilpatrick | |
| 3,617,225 A | 11/1971 | Kuehne et al. | |
| 3,630,688 A | 12/1971 | Takiguchi et al. | |
| 4,153,766 A | 5/1979 | Koide et al. | |
| 4,801,433 A | 1/1989 | Yamanaka et al. | |
| 5,245,057 A | 9/1993 | Shirtum | |
| 5,599,507 A * | 2/1997 | Shaw et al. | 422/135 |
| 5,779,986 A | 7/1998 | van Endert et al. | |
| 6,096,838 A | 8/2000 | Nakamoto et al. | |
| 2003/0139543 A1 | 7/2003 | Wilhelm et al. | |
| 2004/0076073 A1 | 4/2004 | Yao et al. | |

FOREIGN PATENT DOCUMENTS

| | | |
|---|---|---|
| DE | 1495665 | 4/1969 |
| DE | 1925093 | 1/1970 |
| DE | 1570939 | 4/1970 |
| DE | 1745541 | 6/1970 |

(Continued)

*Primary Examiner* — Walter Griffin
*Assistant Examiner* — Natasha Young
(74) *Attorney, Agent, or Firm* — Fish & Richardson P.C.

(57) ABSTRACT

A device for degassing a flowable, viscous and pasty product includes a reactor having a product inlet and a product discharge outlet. A plurality of rotors each defining a reaction zone are located side-by-side in the reactor and a separate driving system mounted outside of the reactor for rotating each rotor with each driving system being an hydraulic system.

23 Claims, 4 Drawing Sheets

FOREIGN PATENT DOCUMENTS

| | | |
|---|---|---|
| DE | 1645630 | 2/1971 |
| DE | 4013912 | 10/1991 |
| DE | 4447422 | 7/1996 |
| DE | 10001477 | 8/2001 |
| DE | 10200230 | 7/2003 |
| DE | 10313150 A1 * | 9/2004 |
| DE | 102004014163 | 12/2004 |
| EP | 0711597 | 5/1996 |
| EP | 0719582 | 7/1996 |

* cited by examiner

REACTOR FOR THE CONTINUOUS AND SIMULTANEOUS PRODUCTION OF DIFFERENT POLYESTER PRODUCTS HAVING ADJUSTABLE VARIABLE VISCOSITY, THE PROGRESS OF THE PROCESS BEING REGULATED VIA THE HYDRAULIC DRIVE SYSTEM

FIELD OF THE INVENTION

The invention relates to a reactor for flowable, highly viscous or pasty media having the distinguishing features of the introductory portion of the main claim.

BACKGROUND OF THE INVENTION

The German Offenlegungsschrift 102 00 230 A1 discloses a stirrer driving mechanism for upright and horizontal reactors. It is in the form of a hydraulic motor, which is disposed directly in the reactor, the product, used in the reactor, being used as hydraulic medium for driving purposes. The hydraulic medium is supplied over a pipeline to the driving mechanism and the driving energy is generated by an external pump station. After the transfer of the driving power for the stirrer, this product is introduced as reactant into the reactor and caused to react further here.

If there is a malfunction or breakdown in the case of this solution, the driving mechanism for the reaction process, which is disposed in the reactor, must be shut down and the repair made by opening the reactor to the atmosphere. Moreover, controlling the process by using a signal of a measured parameter of the driving system is not employed here. The use of the product as a hydraulic medium would also have the disadvantage here that the product, as a result of the process-related temporal changes in its consistency, would not have a constant basis for producing independent signals for process control.

The patent DE 40 13 912 C2 introduces a horizontally aligned reactor, which is equipped with an externally acting and an internally acting rotor, the rotors rotating within one another and scraping the product from their wetted surfaces for efficient mixing and distribution of the product for producing a large surface area and a therewith associated high degree of degassing. The use of the two driving mechanisms, required for this purpose, and the resulting distance of the centers of gravity of the driving system from the reactor wall are disadvantages of this device. Moreover, the arrangement of the scraper rotor in the cage-like rotor, which makes the equipment expensive, may be a possible cause of malfunctioning with regard to maintaining the clearances between the scraper elements and the washers of the squirrel cage rotor and with regard to the long rotor length and the possible transverse deflection of the rotors.

The DE 44 47 422 C2 publication discloses a reactor device, which is provided with a rotor with lattice-like excavations in the hollow body and with mounted perforated disks and spoke wheels. In the interstices of the perforated disks and the spoke wheels, weir arrangements and scraping rods are installed in the region of the polymer bottom at the reactor wall. The reactor is divided over its length into zones by decreasing the intervals and varying the angle of incidence of the perforated disks and the spoke wheels on the hollow body or changed geometrically in accordance with the consistency of the product. With this solution, the objective is pursued of achieving, with a simple construction, an improved stability against twisting and deflection, as well as good mixing and uniformity of the residence time of the product and, with that, a high product quality. In this solution also, the arrangement of the weirs and the scraping rods between the perforated disks and spoke wheels is a disadvantage with respect to possible warping and with that, contacts by forces from the product during rotor movement.

The German Offenlegungsschrift 100 01 477 A 1 discloses a discontinuous polycondensation method with a stirring disk reactor. This reactor is designed for discontinuous operation, in which the moment adjusts as a function of the viscosity, which increases with the time during which the vacuum is applied. There is no control, such as is required in a continuous process. The geometry of the stirring disk reactor is also clearly designed for a discontinuous operation.

The AS 1745541 discloses a polycondensation method and a device, in which an annular disk reactor is described. This annular disk reactor consists of several zones, which, however, are constructed strictly as annular disks. There is no description of reaction material being taken up actively on the annular disks. Moreover, the annular disks produce high friction, which become noticeable negatively in the form of temperature increases and must be corrected. The use of variable-speed drives is expensive and the process data cannot be used in this configuration as an active component of the control of the process.

AS 1495665 introduces a method and a device for the continuous throughput of melts for the production of polycondensation products. This construction is distinguished essentially by annular backing-up elements. In addition, there are spreading and distributing devices. The backing-up elements, described in this construction, are disadvantageous from a chemical engineering point of view, since reaction material can build up on these back-up elements, be decomposed thermally over time and affect product quality. In this device also, comparatively little reactive surface area is produced. This would necessarily drive up the dimensions in the case of high throughputs.

AS 1645630 discloses a devices, honeycombed by partitions, for the polycondensation of liquid pre-condensates. The stirring elements are helical. This supports the transport of the reaction material in the direction of the product exit. An expensive construction of chamber walls is required for this device. It is difficult to achieve a homogeneous mixing of the product due to the chambers. Furthermore, the residence time, produced by the chambers, counteracts the positive transport of the reaction product in the direction of the product discharge.

The Offenlegungsschrift 1570939 introduces polymerization equipment, in which the reaction material is transported through the equipment by means of cage-like screw segments or courses without a shaft. Due to the srew-like nature of the construction, the reaction material is transported in a clearly accelerated fashion, so that the residence time is reduced and consequently, for larger throughputs, the dimensions of the equipment must be increased. The control of the parameters of the reaction material, which is now required in up-to-date equipment, is not dealt with at all.

The Offenlegungsschrift 1925093 discloses a device for completing the condensation of polycondensation products. With the device here, an attempt is made over a plurality of different built-in components, some of which are very complicated, and different disks and scraper components to produce a reactive surface. The built-in components introduced tend to become contaminated and to cause thermal decomposition of adhering material. Built-in components must therefore be realized as simply as possible.

In none of the publications searched was a measure found for using process parameters from the operation of the rotor and their effect for controlling the process. Furthermore, the use of heavy driving mechanisms with a relatively large distance between the center of gravity and the front side of the reactor is not satisfactory or the configuration of the rotors frequently is expensive. The large weight of the driving aggregates with relatively long lever arms are responsible for the exertion of large bending forces on the rotors, the rotor shafts, the front sides of the reactors and the sealing system for the vacuum existing in the reactor. During the operation of the reactor, these large bending forces have a negative effect on the reactor as a whole and on the gaps between the reactor elements and the built-in components, especially if sliding surfaces are used with a minimum clearance between rotor elements and associated housing elements or internally running rotors.

It is an object of the invention to provide a device for the treatment of flowable, highly viscous or pasty media under a vacuum, such as polyesters or other polymers, which uses measured parameters from the operation for the selective, sensitive control of the process with the objective of producing very high quality values for the product up to an intrinsic viscosity of 0.9 dl/g and, furthermore, by using suitable driving mechanisms, achieves minimization of the static and dynamic forces acting on the reactor and, by advantageous design of the reactor and the rotors, improves the method and the operation.

BRIEF DESCRIPTION OF THE INVENTION

This objective is accomplished by the distinguishing features of claim 1. Further developments are given in claims 2 to 23:

The above objective is achieved by providing a reactor having the following features:

1. The reactor is divided into 2 to 4 reaction zones, each of which is equipped with separately acting rotors. For this purpose, each of the rotors is driven by its own hydraulic system, which is supplied by an external pumping station. Moreover, the rotors may be disposed in the following manner:
    a. For the reactor with 2 reaction zones, the basic shaft is constructed as 2 shafts, to which the rotors are attached and which are supported at their mutually adjacent ends in the interior of the reactor and at the front faces of the reactor.
    b. For the reactor with 3 zones, the rotor of reaction zone II is fastened to a basic shaft, which is passed through the reactor and supported at the front faces. The rotors of reaction zones I and III are constructed as hollow shafts and are supported, on the one hand, on the basic shaft in the interior of the reactor and, on the other, the left and right face walls of the reactor, passing through the face walls.
    c. For the reactor with 3 reaction zones, the basic shaft may also be divided into two, as under item "a" above, and a hollow shaft is supported on a basic shaft in the manner described under "b".
    d. For the reactor with 4 zones, a hollow shaft is supported on each of the two basic shafts, as described in the version "c" for 3 zones.

Each of the hydraulic motors is disposed on the outside at the face wall of the reactor and connected with the basic and hollow shaft. The hydraulic motor is operated with a hydraulic medium, the consistency of which, while the motor is operating, is kept constant by controlling the temperature. These constant conditions ensure a reliable basis for measuring and processing a variable in the form of the pressures in the hydraulic medium. The torque, required for the set rpm of the rotor, is determined from the pressures of the hydraulic medium. If the reactor remains filled to the same level and the product temperature is kept constant, this torque provides accurate information concerning the intrinsic viscosity of the product. The intrinsic viscosity is measured according to the ASTM method D4603 or the ISO method 1628-5 for polyethylene terephthalate. For this purpose, a sample of the PET is dissolved in a 60:40 solution of phenol and 1,1,2,2-tetrafluoroethane. From this, the intrinsic viscosity is determined in dimensions of dL/g using the Billmeyer equation.

The measured values, so obtained, serve as control parameters for the vacuum in the reaction space, by means of which the product viscosity is adjusted to the final value. The ascertained value for the intrinsic viscosity of the product in the reactor is compared with the value of the viscosimeter downstream from the reactor and, if necessary, corrected.

Moreover, the operational safety of the reactor after shutdowns and breakdowns is improved by the hydraulic drive. For this purpose, the drive can run up to a nominal rpm at a torque, which is not critical for the rotor. Damage due to excessively high viscosities or a frozen product is avoided.
3. One or more product discharge openings for removing product of different viscosities for separate further processing, are installed in the bottom of the reactor. After a product discharge opening, the rotors are each equipped with a first rotor region for conveying the product in the direction of the next product discharge opening. This avoids that product of a higher viscosity is discharged from the reactor section after this product discharge opening. Subsequently, a rotor region for cross-mixing the product follows.
4. The reaction zones of the reactor are equipped with separate heaters, which can be controlled individually and ensure that the process is conducted in the manner selected.
5. The melt enters the reactor either over a below the surface inlet in the product bottom or over one or more inlets above the product bottom in an above the surface arrangement. These above the surface inlets act constructed as slotted nozzles, in which they are no regions of product deposits in the form of spaces in which there is no flow (free of dead spaces). The melt is distributed over the rotor disks and experiences thereby a pro-active distribution for intensively degasifying it. A product-accommodating device, formed by blades, which are mounted between the disks of the rotor of reaction zone I, supports this pro-active distribution. These blades take a product from the bottom and distribute it during the rotation over the disks, a high specific surface area being generated, which is necessary for the reaction. The blades are perforated, so that, on the one hand, a back flow of the product from the blades commences shortly after the product is taken up and there is the best possible distribution and, on the other, drainage of the blades is ensured in the event that the rotors come to a stop.
6. The rotor in the last reaction zone is configured as a three-dimensional lattice or as a perforated disk, which, in accordance with the existing high melt viscosity, brings about an intensified surface-generated mixing of the product and enables a product to be produced with an intrinsic viscosity of 0.9 dl/g. The static strength of the rotor against bending and torsion is also increased here by tension members additionally affixed.

7. The installation of tension members at the periphery with anchorages at the shaft increases the strength of the rotors against bending and torsion.

The advantages of the inventive configuration of the device are given in the following:

1 Reactor with several separate rotors, which work in the same or in opposite directions and bring about different zones, which have a positive effect on the product in accordance with the requirements of the process control for producing highly viscous polymers.

2 Low-loss, smooth drive of the rotors, at a lower rpm each with a separate hydraulic system, the use of gear mechanisms being avoided.

3 Use of measured variables from the hydraulic driving system for a usable, sensitive signal for control in the process during the production of the desired viscosity. At the same time, exclusion of interfering variables, such as those that arise due to the mechanical gears required in the case of an electrical drive and due to mechanical wear.

4 Decrease in the mass of the drive and of the distance of its center of gravity from the front side of the reactor in comparison to electrical drives; with that, avoidance of high bending moments acting on the rotor and of wear of the driving system.

5 Assurance of a first pro-active distribution of the product due to entry into the reactor over a slotted nozzle and/or due to take-up of the product from the bottom and subsequent distribution by means of a product take-up device in the form of blades in the inventive configuration. Improvement in and better efficiency during the degassing of the melts.

6 Installation of several discharging openings for the fractional removal of product according to a selectively produced viscosity from a total process. Due to the inventive configuration of the rotors, product discharge from the reactor section after the discharge site is avoided.

7 Inventive configuration of the rotor in the last zone of the reactor for degassing the product and four producing a high intrinsic viscosity up to 0.9 dl/g.

8 Minimizing the deflection of the rotors, reducing the wear at the bearings and reducing the energy taken up, smooth operation and positive effect on the process.

BRIEF DESCRIPTION OF THE DRAWINGS

The inventive device is explained in greater detail in an example that follows. Details are shown in the drawing, in which.

DETAILED DESCRIPTION OF THE INVENTION

Figure 1:
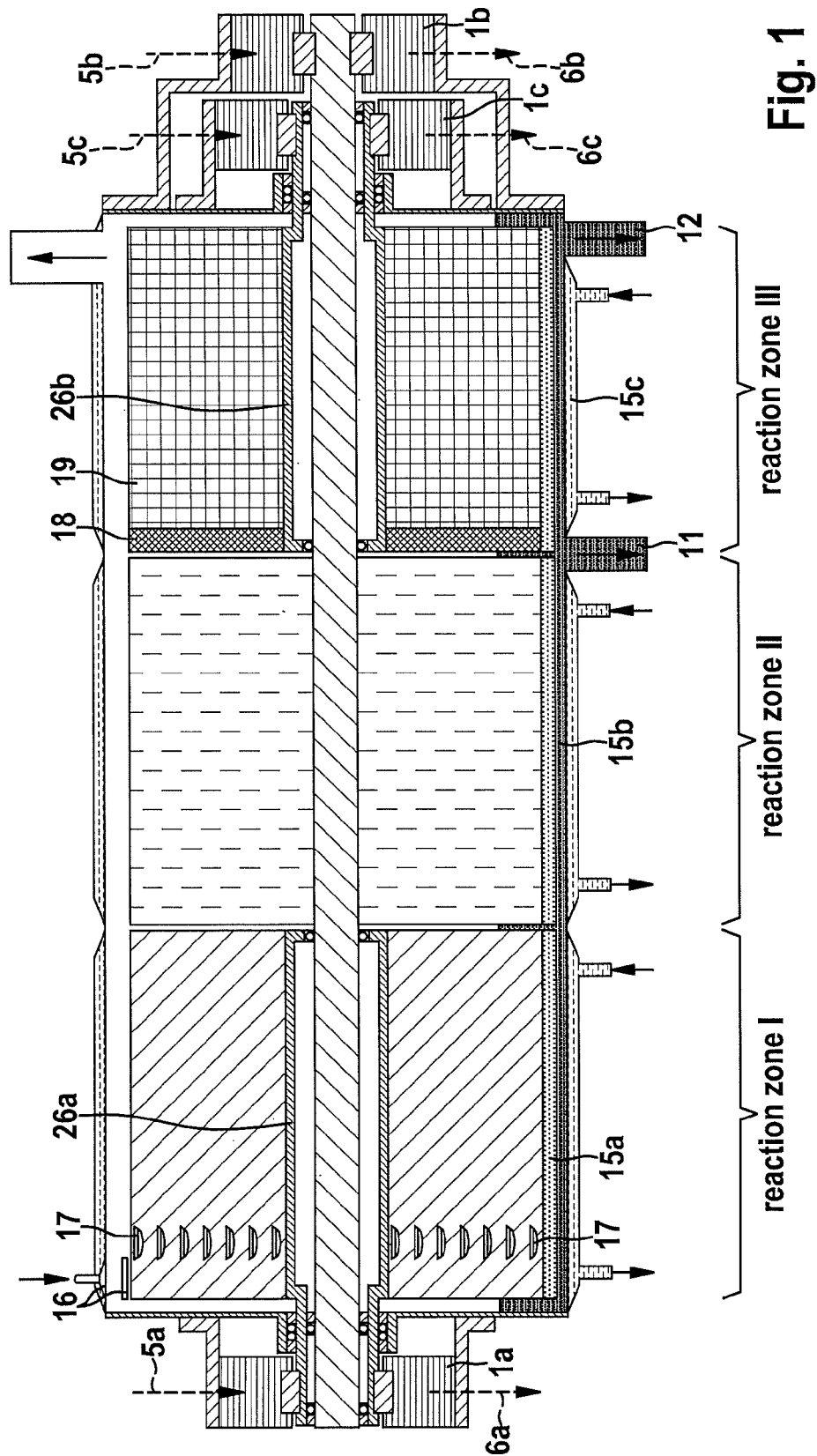
FIG. 1 shows a reactor with 3 reaction zones.

FIG. 1 shows a reactor with 3 reaction zones for degassing continuously the products of the reaction of a carboxylic acid with a multihydric alcohol. It has 3 hydraulic drives 1a, 1b and 1c for the 3 rotors of the reaction zones I, II and III. The drives for the rotors are connected over inlet pipelines 5 and return pipelines 6 with hydraulic systems. The hydraulic drives are distinguished by a low mass, controllable low rates of revolution and the use of operating parameters of the drives for controlling the reaction.

The rotor of the reaction zone II is fastened and to a continuous basic shaft 25, which is supported on the left side in the internal bearings of the hollow shaft of the rotor of the reaction zone I and, on the right side, in the internal bearings of the rotor of the reaction zone III. The rotor for the reaction zone I is fixed on a hollow shaft 26a, which is supported at the left side against the front face of the reactor and on the right side on the basic shaft. The rotor for the reactions III is also fixed on a hollow shaft 26b, which is supported on the right side against the front end of the reactor and on the left side on the basic shaft. The bearings of the shafts can compensate for the thermal expansion of the rotors and of the reactor housing.

Figure 2:
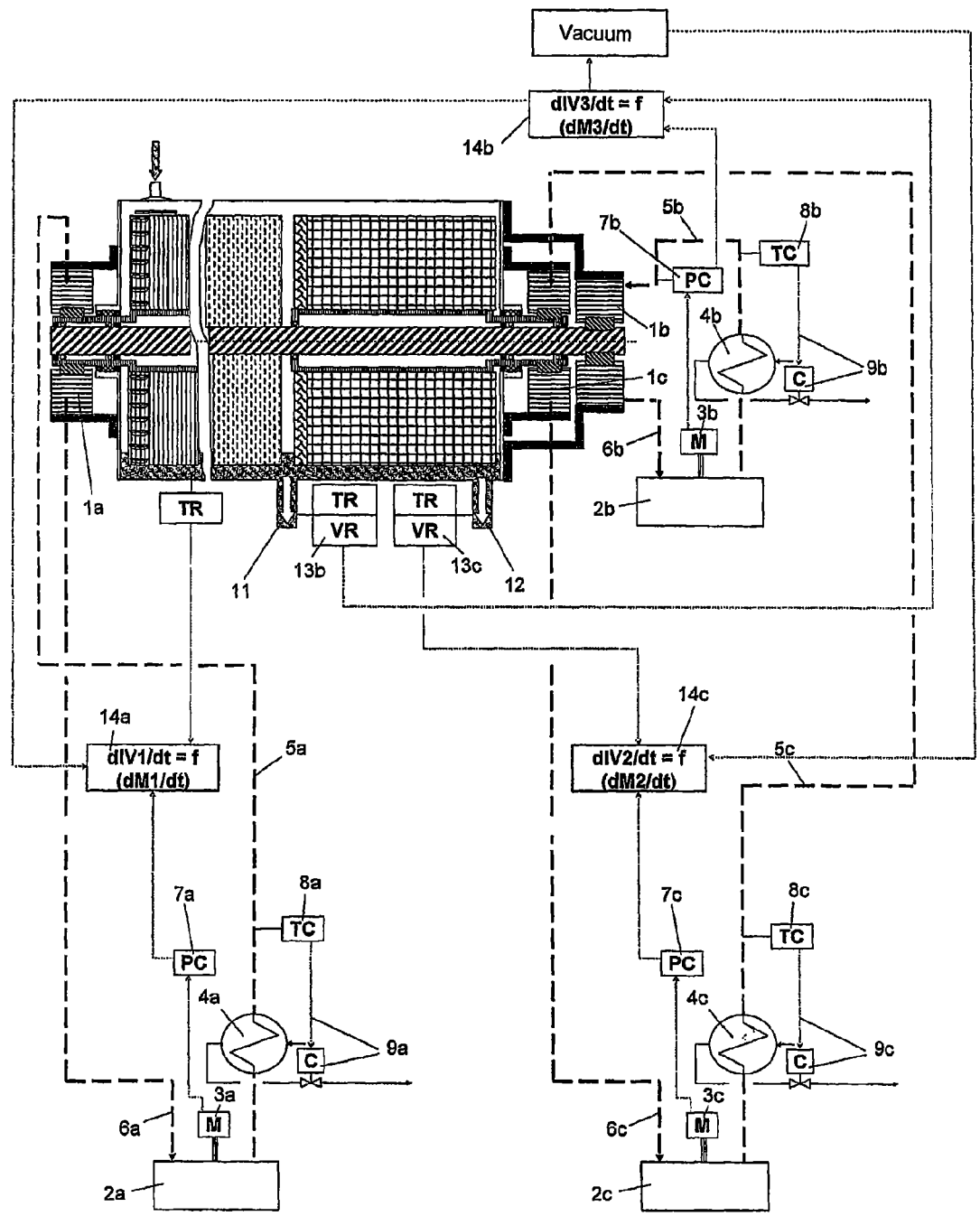
FIG. 2 shows the representation of the drive system and of the control of the process.

The hydraulic system for the drives 1 of the rotors are shown in FIG. 2. Each of these systems consists of a pump station 2, a motor 3 for the input of energy, a cooling apparatus 4 for cooling the hydraulic medium, preferably hydraulic oil, an inlet pipeline 5 and a return pipeline 6 for the hydraulic medium, a pressure measuring device 7 in the inlet pipeline 5, a temperature measuring device 8 for the regulation 9 of the temperature of the hydraulic medium by controlling the amount of cooling agent in the cooling apparatus 4. A first discharge 11 for product with an intrinsic viscosity of 0.6 to 0.65 dL/g, is installed behind the reaction zone II. A second discharge 12 for the highly viscous product with an intrinsic viscosity of up to 0.9 dL/g is located at the end of the reactor. The values of these viscosities and the respective product temperatures are measured by assigned measuring sites 13. Control signals, which are sent to the pressure control devices 7 and can be utilized in the measured value processing devices 14, are produced for determining measured values and for processing the data for conducting the process. This is accomplished owing to the fact that the intrinsic viscosity, measured by measuring sites 13 as a function of product temperature, is related to the torque determined by the hydraulic guiding system (or also to the average or averages of the hydraulic systems). The control parameters, arising therefrom, control the vacuum in the system, by means of which the target viscosity of the product can be adjusted and kept constant with far shorter dead times, than it can with conventional systems. In addition, a control of the rotor or stirrer speed is provided for achieving higher target viscosities in the polymer.

The torque, required for the permanently set rotational speed of the rotor, is determined from the pressures of the hydraulic medium. If the level, to which the reactor is filled, and the product temperature remain constant, this torque provides precise information concerning the intrinsic viscosity of the product. The measured values, so obtained, are used as control parameters for the vacuum in the reaction space, by means of which the final product viscosity is adjusted. The value, determined for the intrinsic viscosity of the product in the reactor, is compared with that of the viscosimeter downstream from the reactor and, if necessary, corrected.

The drive motor rose 3 are processed directly here in that, if low pressures 7 are required, the hydraulic driving power is throttled and, if higher pressures are required, the hydraulic driving power is increased. This inventive control is significantly more sensitive than an alternative processing of torques in the case of electric drives. In the latter cases, interposed interfering parameters, such as transmission losses, slippage and wear are responsible for defective measurements and an unsatisfactory conduct of the process. The output of the control signal, acquired in the measured value processing unit 14, on the pressure 7 in the hydraulic inlet and the therefrom resulting control of the drive motor 3 for the hydraulic system, is a signal processing system, which is free of external interference, and optimum for conducting the process in a very efficient manner in order to achieve the highest product qualities. The rotors may rotate in the same or in opposite directions. The rotational speeds may be adjusted to different values.

Advantageously, the reaction zones I to III are each equipped with separately controlled heaters 15a to 15c, with which the process temperatures of the product can be adjusted selectively in the reaction zones. This has the advantage that the process is controlled better by affecting the temperature selectively.

The product is added to the reactor through one more slotted nozzles 16, which are disposed above the product bottom (above the surface arrangement). The junctions of the slots and the product space are directly at the level of the start of the rotor for reaction zone I and lie on the side of the upwardly directed rotor movement. They are installed at an angle of 75° and 20° with the perpendicular. The slots are constructed so that there are no dead spaces for deposits. With this distribution, the product is added to the disks directly at the inlet. As a result, the necessary reaction surface area is generated more quickly than when product is added at the bottom.

Figure 3:
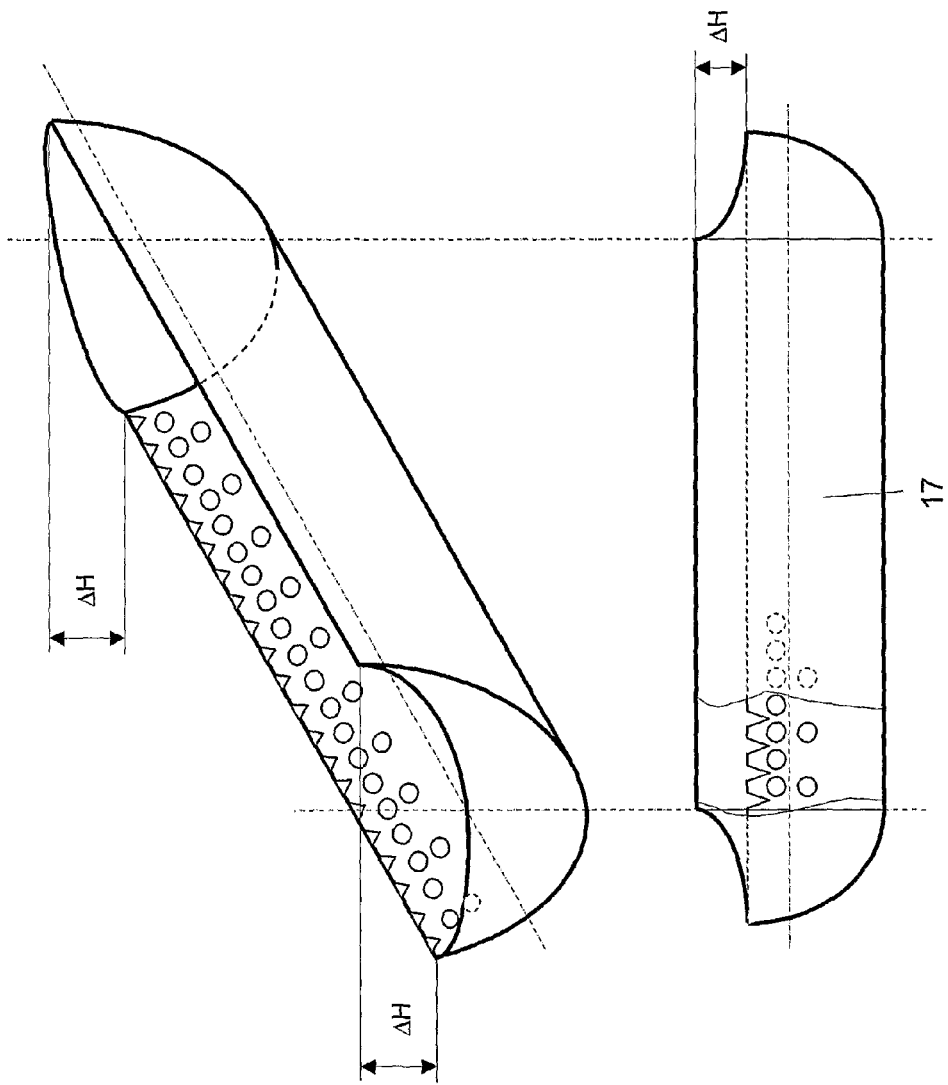
FIG. 3 shows the representation of a detail of the product take-up device and FIG. 4 shows the configuration of the basic shaft as well as of a section of the three-dimensional lattice construction for the region of cross mixing of the rotor of reaction zone III.

In order to increase the necessary reaction surface area further, a product intake in the form of blades 17, which are fastened between several disks, is installed at the periphery of the rotor of the reaction zone I immediately after the position of the slotted nozzles. When the rotor is moving, these blades take product from the bottom. During the rotation upward, the product runs out of the perforated rear wall back onto the disks. The perforation is arranged in such a manner that the outflow increases as the angle of rotation increases. By these means, the generation of the surface area, necessary for the reaction, as well as the carry-along effect of the disks is actively supported. The blades are constructed without dead spaces. The rear wall of the blades is lower than the front wall. This product intake may also be installed in reaction zone II. The configuration of the blades is shown in FIG. 3.

Figure 4:
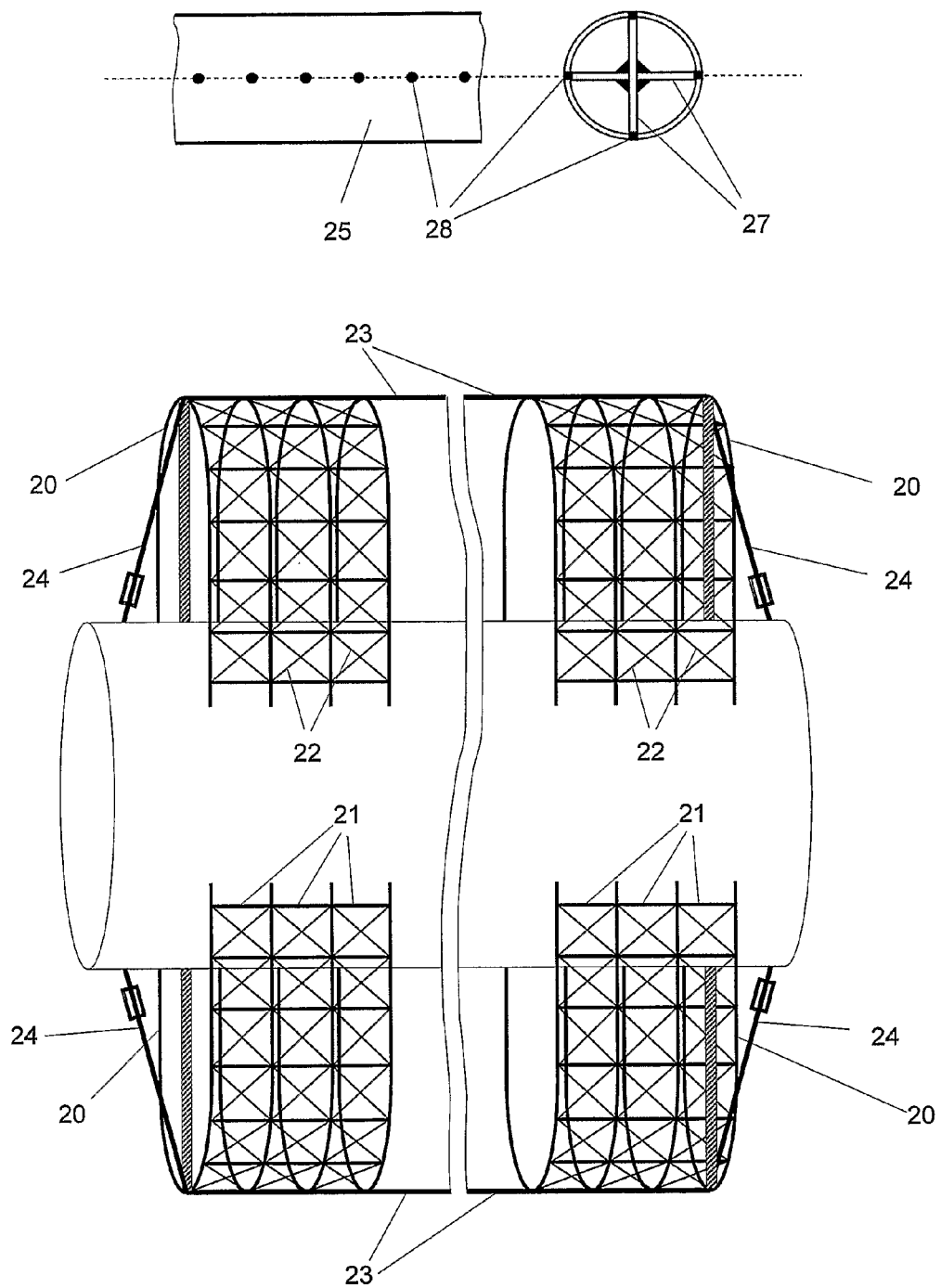

The reactor is equipped with two product exits. The first exit 11 serves for the removal of product with an intrinsic viscosity ranging from 0.6 to 0.65 dL/g and the second exit 12 serves for the removal of the final product with an intrinsic viscosity of 0.9 dL/g. Accordingly, it is ensured that product of two qualities can be taken from the reaction. The rotor of the reaction zone III after the product exit 11 has two functional areas. In the first area, a device 18 is installed after the second exit for achieving a positive conveying of the product in the direction of the second exit and of avoiding flow of the product back out of the space. The second area comprises a three-dimensional lattice construction 19 for intensive mixing, cross-mixing and generating the necessary reaction surface area of the highly viscous product in the reaction zone III and, with that, for the efficient reaction of the product. The construction of the lattice is shown in FIG. 4. It consists of U-shaped arcs 20 of round rods, disposed in planes. The layers of U-shaped arcs are fastened to the hollow shaft and are connected in parallel in each case with spacer rods 21, which are also round rods of the same diameter. A further two rods 22 are fastened crosswise in each of the areas formed by the U-shaped arcs and the spacer rods, so that as large a reaction surface as possible is achieved for the highly viscous product and, at the same time, a very rigid lattice construction results for the movement in the highly viscous product. Further longitudinal rods 23, distributed over the periphery, are disposed axially and fastened at the vertices of the U-shaped arcs over the whole length of the second rotor area for cross mixing the product. By these means, an additional mixing of the product in the bottom is produced. The longitudinal rods are connected over tension members 24 with the shaft of the rotor, so that tensile forces, which result from the deflection in the lower layer during the rotation, can be dissipated. By these means, a stiffening of the lattice construction and of the rotor against deflection is achieved. The same effect is also achieved for the other rotors by disposing longitudinal rods and connecting with the shafts. The basic shafts are constructed from pipe, in which the internal stiffenings 27 are inserted and connected. Advantageously, this is arranged from a stabilizer in the form of a sheet-metal cross, which is introduced and fits tightly into the free cross-section of the pipe, extends over the whole length of the rotor and, at intervals, welded to the pipe through boreholes 28 in the pipe and subsequently processed to size (see FIG. 4).

Aside from the arrangement and mounting of the rotors in the reactor, introduced in the example, other constructions are also possible:

1. Basic shaft divided with a double bearing, installed in the reactor, preferably fastened on a support, separate hydraulic drive for each of the two basic shafts in the version described above and control system (two-zone reactor with two drives).
2. Construction as described under item 1 above and a hollow shaft supported on a basic shaft, also with separate drive, as described above (three-zone reactor with three drives).
3. Construction as described under item 2, however with two hollow shafts, each of which is supported on a basic shaft and driven separately, as described above (four-zone reactor with four drives).
4. Continuous basic shaft, on which rotors are fastened, for example, of different construction for reaction zones I and II with a drive, as described above, a hollow shaft as a rotor for the reaction zone III supported on a basic shaft and driven separately, as described above, arrangement of the drives on one side or in the opposite end faces of the reactor (three-zone reactor with two drives).

The invention claimed is:

1. A device for degassing a flowable, viscous and pasty product comprising:
   a reactor having a product inlet and a product discharge outlet;
   a plurality of rotors in series, each defining a reaction zone located side-by-side within said reactor; and
   a separate driving system mounted outside of said reactor for rotating each said rotor.

2. The device of claim 1 wherein each said driving system is an hydraulic system.

3. The device of claim 2 further comprising a device for controlling the vacuum in an hydraulic system with a measured intrinsic viscosity as a target variable and the average value of the torque that the hydraulic system produces on the rotor driver that is determined by the hydraulic system as an input variable.

4. The device of claim 2 further comprising a temperature controlling device for a said hydraulic system to fix the consistency of the hydraulic medium of the hydraulic system.

5. The device of claim 2 further comprising a basic shaft that extends the length of said reactor respectively connected between each said rotor of said plurality of rotors and driven by a said hydraulic system, and a hollow shaft located over said basic shaft connected to another of said rotors of said plurality of rotors and driven by another one of said hydraulic systems.

6. The device of claim 5 wherein the basic shaft is formed from two divided shafts, which are carried at their adjacent ends in the reactor by internal shaft bearings and are driven separately by a respective drive system.

7. The device of claim 5 wherein the reactor is equipped with only one hollow shaft with its appropriate mounting and associated driving system disposed on one of the opposite sides of the reactor.

8. The device of claim 5 wherein the drive for the basic shaft and the drive for the hollow shaft are disposed on opposite faces of said reactor.

9. The device of claim 5, wherein the drive for the basic shaft and the drive for the hollow shaft are disposed on the same face of the reactor.

10. The device of claim 5 wherein the basic shaft comprises a pipe having an internal stiffening in the form of a sheet-metal cross and connected to the pipe and welded at intervals to the pipe through boreholes in the pipe.

11. The device of claim 1 further comprising at least one slotted inlet nozzle in the reactor disposed above the level of the substance in the reactor for generating the necessary product surface area.

12. The device of claim 11 wherein the slotted nozzles are disposed above the level at an angle of 90° to 40° and 40° to 5° with the perpendicular to the center line of the horizontal reactor.

13. The device of claim 11 wherein the slotted nozzles are configured with an angle of 5° to 45° in the expansion and of 2° to 30° in the retraction in order to avoid buildup of material and thermal degradation of the product and terminate flush with the inner surface of the reactor.

14. The device of claim 1 wherein in at least a first reaction zone the rotor has a product-accommodating device in the form of blades which avoid different residence times of the product in the blades.

15. the device of claim 14 wherein said product accommodating device has sides which are the rear sides in the direction of rotation, 50 to 50% lower than the oppositely disposed front side and have perforations which are disposed below the edge of the rear wall, the liquid level of the product, by changing the position of the blades during the rotation, runs over earlier and in a greater amount that it would if the two sides were configured with equal heights.

16. The device of claim 14 wherein said blades are configured with curved surfaces all around and empty the rotor even when stopped.

17. The device of claim 1 wherein said product outlet in the reactor corresponds to the product properties which are to be attained.

18. The device of claim 1 wherein the rotor in a last reaction zone has a construction in the form of a three-dimensional lattice for the cross mixing necessary for adjusting the product properties.

19. The device of claim 18 wherein said three-dimensional lattices for producing an intrinsic viscosity of 0.82 to 0.9 dL/g are fastened to the shaft or to the hollow body of the rotor in the form of elements of round rods in a U shape, which are disposed radially and in layers, the layers being kept apart by interposed spacer rods and further rods being mounted as cross connections between the connecting points of the U shaped arcs and the spacer rods.

20. The device of claim 1 wherein said driving systems can select the directions of rotation of the rotors in the reactor to be the same or opposite.

21. The device of claim 1 wherein the rotors are disposed as a first region enabling a positive conveying of the product in the direction of the subsequent discharge, as a result of which the exit of product of higher viscosity from a subsequent reaction zone of the reactor is avoided, and s second region having a surface area generating and cross-mixing construction.

22. The device of claim 1 wherein there are a plurality of product discharge outlets with a first product discharge outlet disposed after a reaction zone for a product with the intrinsic viscosity of 0.6 to 0.65 dL/g and a second product discharge outlet disposed after a reaction zone for a product with the intrinsic viscosity of 0.82 to 0.9 dL/g.

23. The device of claim 1 wherein said three-dimensional lattices are provided with axial longitudinal rods which are disposed over the length of the region of the rotor for cross-mixing, are fastened at the vertex of the U-shaped rods, serve as a surface-generating and cross-mixing construction for the process and bring about a stiffening of the three-dimensional lattice.

* * * * *